United States Patent
Takeuchi et al.

(10) Patent No.: US 6,221,534 B1
(45) Date of Patent: Apr. 24, 2001

(54) ALKALI METAL ELECTROCHEMICAL CELL HAVING AN IMPROVED CATHODE ACTIVATED WITH A NONAQUEOUS ELECTROLYTE HAVING A CARBONATE ADDITIVE

(75) Inventors: Esther S. Takeuchi, East Amherst; Randolph A. Leising, Williamsville; Hong Gan, East Amherst, all of NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 0 days.

(21) Appl. No.: 09/200,304

(22) Filed: Nov. 25, 1998

(51) Int. Cl.$^7$ ...................................................... H01M 6/04
(52) U.S. Cl. .......................... 429/347; 429/219; 429/220; 429/231.2; 429/231.5
(58) Field of Search ..................................... 429/324, 327, 429/330, 215, 218.1, 231.5, 231.95, 219, 220, 221, 223, 224, 231.1, 231.2, 347

(56) References Cited

U.S. PATENT DOCUMENTS

| | | | |
|---|---|---|---|
| 2,583,589 | 1/1952 | O'Connor | 136/100 |
| 3,489,611 | 1/1970 | Braeuer | 136/6 |
| 3,567,515 | 3/1971 | Maricle et al. . | |
| 3,825,445 | 7/1974 | MacCarthy | 136/83 |
| 4,132,837 | 1/1979 | Soffer | 429/194 |
| 4,143,214 | 3/1979 | Chang et al. | 429/112 |
| 4,224,389 | 9/1980 | Peled | 429/213 |
| 4,264,689 | 4/1981 | Moses | 429/194 |
| 4,273,839 | 6/1981 | Carr et al. | 429/51 |
| 4,310,609 | 1/1982 | Liang et al. | 429/194 |
| 4,444,855 | 4/1984 | Blomgren et al. | 429/105 |
| 4,482,616 | 11/1984 | Connolly et al. | 429/101 |
| 4,489,144 | 12/1984 | Clark | 429/196 |
| 4,520,084 | 5/1985 | Tinker et al. | 429/101 |
| 4,536,456 | 8/1985 | Evans | 429/194 |
| 4,604,330 | 8/1986 | Walsh | 429/13 |
| 4,612,265 | 9/1986 | Connolly et al. | 429/196 |
| 4,622,276 | 11/1986 | Walsh | 429/46 |
| 4,654,278 | 3/1987 | McManis, III et al. | 429/112 |
| 4,663,249 | 5/1987 | Gordon | 429/14 |
| 4,670,358 | 6/1987 | Gordon et al. | 429/15 |
| 4,786,567 | 11/1988 | Skyllas-Kazacos et al. | 429/19 |
| 4,814,241 | 3/1989 | Nagashima et al. | 429/199 |
| 4,830,940 | 5/1989 | Keister et al. | 429/194 |
| 4,894,302 | 1/1990 | Hoffman et al. | 429/194 |
| 4,906,538 | 3/1990 | Toyosawa et al. | 429/197 |
| 4,929,748 | 5/1990 | Franklin | 558/276 |
| 5,112,704 | 5/1992 | Furukaw et al. | 429/194 |
| 5,219,675 | 6/1993 | Kamide et al. | 429/46 |
| 5,221,453 | 6/1993 | Crespi | 204/291 |
| 5,346,787 | 9/1994 | Chaloner-Gill | 429/192 |
| 5,350,648 | 9/1994 | Kagawa et al. | 429/218 |
| 5,393,621 | 2/1995 | Chaloner-Gill | 429/192 |
| 5,455,127 | 10/1995 | Olsen et al. | 429/192 |
| 5,470,674 | 11/1995 | Doddapaneni et al. | 429/50 |
| 5,478,674 | 12/1995 | Miyasaka | 429/218 |
| 5,498,495 | 3/1996 | Takada et al. | 429/219 |
| 5,506,078 | 4/1996 | Davidson et al. | 429/224 |
| 5,523,481 | 6/1996 | Pies et al. | 562/894 |
| 5,580,684 | 12/1996 | Yokoyama et al. | 429/194 |
| 5,658,688 | 8/1997 | Jolson | 429/194 |
| 5,670,276 | 9/1997 | Takeuchi et al. | 429/219 |
| 5,753,389 | 5/1998 | Gan et al. | 429/197 |

FOREIGN PATENT DOCUMENTS

WO 96/29750 * 9/1996 (WO) .

OTHER PUBLICATIONS

R.A. Leising and E.S. Takeuchi, Chemistry of Materials, 5,738–742 (1993).

* cited by examiner

*Primary Examiner*—Laura Weiner
(74) *Attorney, Agent, or Firm*—Hodgson Russ LLP

(57) ABSTRACT

The present invention is directed to an unexpected benefit in a lithium cell derived from using a combination of silver vanadium oxide prepared in a temperature range of about 450° C. to about 500° C. activated with a nonaqueous electrolyte having a passivation inhibitor additive selected from a nitrite, a nitrate, a carbonate, a dicarbonate, a phosphonate, a phosphate, a sulfate and hydrogen fluoride, and mixtures thereof. The benefits include additional battery life resulting from a reduction in voltage delay and RDC build-up. A preferred electrolyte is 1M LiAsF$_6$ in a 50:50 mixture, by volume, of PC and DME having dibenzyl carbonate added therein.

7 Claims, 3 Drawing Sheets

ALKALI METAL ELECTROCHEMICAL CELL HAVING AN IMPROVED CATHODE ACTIVATED WITH A NONAQUEOUS ELECTROLYTE HAVING A CARBONATE ADDITIVE

BACKGROUND OF THE INVENTION

1. Field of the Invention

The present invention generally relates to the conversion of chemical energy to electrical energy, and more particularly, to an alkali metal electrochemical cell having a transition metal chalcogenide activated with a nonaqueous electrolyte including a passivation inhibitor additive provided therein.

2. Prior Art

U.S. Pat. Nos. 4,310,609 and 4,391,729 to Liang et al. disclose the preparation of silver vanadium oxide as a cathode material for use in a nonaqueous electrolyte battery. These patents describe the preparation of silver vanadium oxide by a thermal decomposition reaction involving a final heat treatment step of about 360° C.

U.S. Pat. No. 4,830,940 to Keister et al. describes a solid cathode, liquid organic electrolyte, lithium cell for delivering high current pulses. The solid cathode includes as an active material $Ag_xV_2O_y$ wherein x is in the range from about 0.5 to about 2.0 and y is in the range from about 4.5 to 6.0. Keister et al. reference the publication "Effect of Silver Content on the Performance of Primary Lithium/Silver Vanadium Oxide Batteries", E. S. Takeuchi and P. Keister, Electrochemical Society, Oct. 13–18, 1985, Las Vegas, Nevada, Abstract No. 125, which describes the preparation of silver vanadium oxide at about 360° C. from the thermal decomposition of silver nitrate and vanadium pentoxide.

U.S. Pat. No. 5,221,453 to Crespi discloses the preparation of silver vanadium oxide by a chemical addition reaction (combination of $AgVO_3$ and $V_2O_5$ or $Ag_2O$ and $V_2O_5$) in a temperature range of about 300° C. to about 700° C. The chemical addition reaction is described as being distinct from the thermal decomposition reaction described by Liang et al. and Keister et al.

In the publication R. A. Leising and E. S. Takeuchi, *Chemistry of Materials*, 5, 738–742 (1993) the preparation of silver vanadium oxide by the thermal decomposition of $AgNO_3$ and $V_2O_5$ at temperatures of 320° C., 375° C., 450° C., and 540° C. is described. That publication also reports discharge results of experimental Li/SVO cells containing those variously prepared silver vanadium oxide materials activated with 1M $LiAsF_6$ PC/DME electrolyte. The 375° C. prepared SVO material gave slightly higher delivered capacity than the 450° C. material, and significantly higher capacity than the SVO material prepared at 540° C. The delivered capacity of these cells was measured using a constant resistance discharge over a short period of time (less than 2 days).

U.S. Pat. No. 5,753,389 to Gan et al. describes the use of organic carbonate additives in nonaqueous electrolyte lithium batteries to reduce or eliminate voltage delay.

SUMMARY OF THE INVENTION

The present invention relates to a nonaqueous electrolyte, alkali metal/transition metal chalcogenide electrochemical cell and, in particular, a lithium/silver vanadium oxide electrochemical cell designed for high current pulse discharge applications while exhibiting reduced or no appreciable voltage delay and reduced RDC build-up. An example of such an application is an implantable cardiac defibrillator, where the battery may run under a light load, device monitoring mode for extended periods of time interrupted by high rate, current pulse discharge during device activation.

Voltage delay is a phenomenon typically exhibited in an alkali metal/transition metal chalcogenide cell, and particularly a lithium/silver vanadium oxide cell, that has been depleted of about 40o to about 70% of its capacity and is subjected to current pulse discharge applications. The occurrence of voltage delay is detrimental because it may result in delayed device activation and shortened device life. RDC build-up is characterized by an increase in cell resistance exhibited in lithium/silver vanadium oxide cells that have been depleted of about 50% to about 100% of their capacity. RDC build-up also results in a lowering of pulse minimum voltages during high rate discharge, which in turn limits the life of the battery.

The desirable decrease in both voltage delay and RDC build-up is realized in lithium cells that, according to the present invention, contain a transition metal chalcogenide active material, and most preferably silver vanadium oxide, prepared at a temperature of about 400° C. or greater, and preferably in a range of about 450° C to about 500° C and are activated with an electrolyte comprising 1M $LiAsF_6$ dissolved in a 50:50 mixture, by volume, of PC and DMC having a passivation inhibitor additive provided therein. The increase in usable cell capacity, and subsequent increase in battery life using this new combination is unexpected based on the published capacity data for SVO prepared at 450° C. and discharged under quick discharge conditions. In the published report, the 450° C. SVO gave less capacity than SVO prepared at 375° C.

DETAILED DESCRIPTION OF THE PREFERRED EMBODIMENTS

Figure 1:
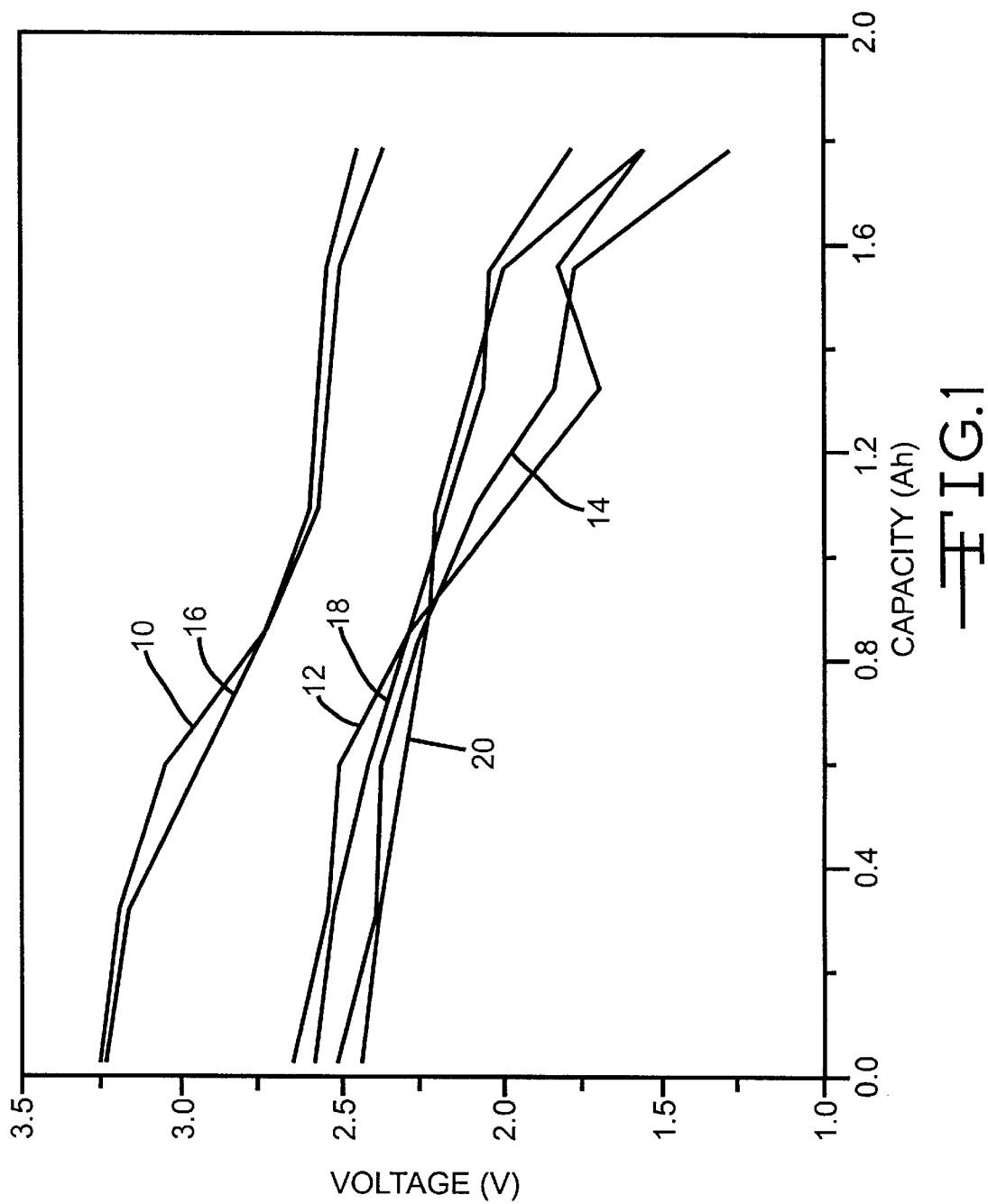
FIG. 1 is a graph constructed from the pulse discharge results of a prior art Li/SVO cell group having a cathode active material prepared at 375° C. in comparison to a present invention Li/SVO cell group having a cathode active material prepared at 450° C. and with dibenzyl carbonate (DBC) added to the electrolyte.

As used herein, the term "pulse" means a short burst of electrical current of a significantly greater amplitude than that of a prepulse current immediately prior to the pulse. A pulse train consists of at least two pulses of electrical current delivered in relatively short succession with or without open circuit rest between the pulses.

Lower pulse voltages caused by voltage delay, even if only temporary, are undesirable since they can cause circuit failure in device applications, and effectively result in shorter cell life. RDC build-up also reduces the life of the battery by lowering the pulse voltage during high rate discharge. As is well known by those skilled in the art, an implantable cardiac defibrillator is a device that requires a power source for a generally medium rate, constant resistance load component provided by circuits performing such functions as, for example, the heart sensing and pacing functions. From time to time, the cardiac defibrillator may require a generally high rate, pulse discharge load component that occurs, for example, during charging of a capacitor in the defibrillator for the purpose of delivering an electrical shock to the heart to treat tachyarrhythmias, the irregular, rapid heartbeats that can be fatal if left uncorrected. Accordingly, reduction and even elimination of voltage delay during a current pulse application is important for proper device operation and extended device life.

The electrochemical cell of the present invention is particularly suited for powering an implantable medical device such as a cardiac defibrillator and the like. The cell comprises an anode of a metal selected from Groups IA, IIA and IIIB of the Periodic Table of the Elements, including lithium, sodium, potassium, etc., and their alloys and intermetallic compounds including, for example, Li—Si, Li—Al, Li—B and Li—Si—B alloys and intermetallic compounds. The preferred anode comprises lithium. An alternate anode comprises a lithium alloy, such as lithium-aluminum alloy. The greater the amount of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising nickel, to form an anode component. In the exemplary cell of the present invention, the anode component has an extended tab or lead of the same material as the anode current collector, i.e., preferably nickel, integrally formed therewith such as by welding and contacted by a weld to a cell case of conductive material in a case-negative electrical configuration. Alternatively, the anode may be formed in some other geometry, such as a bobbin shape, cylinder or pellet to allow an alternate low surface cell design.

The electrochemical reaction at the cathode involves conversion of ions which migrate from the anode to the cathode into atomic or molecular forms. The cathode material of the present invention comprises at least a first transition metal chalcogenide constituent which may be a metal, a metal oxide, or a mixed metal oxide comprising at least a first and a second metals or their oxides and possibly a third metal or metal oxide, or a mixture of a first and a second metals or their metal oxides incorporated in the matrix of a host metal oxide. The cathode active material may also comprise a metal sulfide.

The metal oxide or the mixed metal oxide can be produced by the chemical addition, reaction, or otherwise intimate contact of various metal oxides and/or metal elements, preferably during thermal treatment or chemical vapor deposition in mixed states. The active materials thereby produced contain metals, oxides and sulfides of Groups IB, IIB, IIIB, IVB, VB, VIB, VIIB, and VIII of the Periodic Table of Elements, which includes the noble metals and/or other oxide compounds.

According to one embodiment of the present invention, readily decomposable compounds consisting of metals from Groups IB, IIB, IIIB, IVB, VB, VIB, VIIB, as well as similarly decomposable compounds from Group VIII, are thermally treated so as to effect the rapid preparation of the oxides or the respective metal elements themselves to be utilized further in the preparation of suitable cathode materials. Such readily decomposable materials include, but are not limited to, those classes of compounds known as nitrates, nitrites, carbonates, and/or ammonium salts. The precursor materials (i.e., nitrates, nitrites, carbonates, ammonium compounds, etc.) may be decomposed in a combined state or individually decomposed and thereafter combined in an oxide/decomposable metal salt compound and subsequently decomposed to form the cathode composite matrix.

Preferred cathode composites are prepared by thermally decomposing a vanadium salt, suitably ammonium metavanadate, to produce vanadium pentoxide. A decomposable metal salt, suitably the nitrate, of a second metal is then added to the vanadium pentoxide, thoroughly mixed therewith and thereafter ignited. The second metal is most preferably selected from the group consisting of silver, copper, manganese and mixtures thereof. The resultant composite cathode includes $V_2O_x$ wherein $x \leq 5$ combined with one or more of $Ag_2O$ wherein x=0 to 1; $CuO_x$ wherein x=0 to 1; and $MnO_x$ wherein x=1 to 3. Thus, the composite cathode material may be described as a metal oxide-metal oxide, a metal-metal oxide, or a metal-metal oxide-metal oxide.

By way of illustration, and in no way intended to be limiting, an exemplary transition metal oxide cathode active material comprises silver vanadium oxide having the general formula $Ag_xV_2O_y$ in any one of its many phases, i.e. β-phase silver vanadium oxide having in the general formula x=0.35 and y=5.18, μ-phase silver vanadium oxide having in the general formula x=0.74 and y=5.37 and ε-phase silver vanadium oxide having in the general formula x=1.0 and y=5.5, and combination and mixtures of phases thereof. For a more detailed description of silver vanadium oxide cathode materials, reference is made to U.S. Pat. Nos. 4,310,609 to Liang et al., 5,389,472 to Takeuchi et al., 5,498,494 to Takeuchi et al. and 5,695,892 to Leising et al., all which are assigned to the assignee of the present invention and incorporated herein by reference.

Another preferred transition metal oxide useful with the present invention is a composite cathode active material that includes $V_2O_z$ wherein $z \leq 5$ combined with $Ag_2O$ with the silver in either the silver(II), silver(I) or silver(0) oxidation state and CuO with the copper in either the copper(II), copper(I) or copper(0) oxidation state to provide the mixed metal oxide having the general formula $Cu_xAg_yV_2O_z$, (CSVO). Thus, this composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about $0.01 \leq x \leq 1.0$, about $0.01 \leq y \leq 1.0$ and about $5.01 \leq z \leq 6.5$. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material, reference is made to U.S. Pat. No. 5,472,810 to Takeuchi et al. and U.S. Pat. No. 5,516,340 to Takeuchi et al., both of which are assigned to the assignee of the present invention and incorporated herein by reference.

Additional cathode active materials include manganese dioxide, cobalt oxide, nickel oxide, copper vanadium oxide, titanium disulfide, copper oxide, copper sulfide, iron sulfide and iron disulfide, and mixtures thereof. In secondary cells, the positive electrode preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

To discharge such secondary cells, the lithium metal comprising the positive electrode is intercalated into a carbonaceous negative electrode or anode by applying an externally generated electrical potential to recharge the cell. The applied recharging electrical potential serves to draw the alkali metal from the cathode material, through the electrolyte and into the carbonaceous anode to saturate the carbon comprising the anode. The cell is then provided with an electrical potential and is discharged in a normal manner.

An alternate secondary cell construction comprises intercalating the carbonaceous material with the active alkali material before the negative electrode is incorporated into the cell. In this case, the positive electrode body can be solid and comprise, but not be limited to, such materials as manganese dioxide, silver vanadium oxide, titanium disulfide, copper oxide, copper sulfide, iron sulfide, iron disulfide and fluorinated carbon. However, this approach is comprised by the problems associated with handling lithiated carbon outside of the cell. Lithiated carbon tends to react when contacted by air or water.

The above described active materials are formed into an electrode for incorporation into an electrochemical cell by mixing one or more of them with a conductive additive such as acetylene black, carbon black and/or graphite. Metallic materials such as nickel, aluminum, titanium and stainless steel in powder form are also useful as conductive diluents when mixed with the above listed active materials. The electrode further comprises a binder material which is preferably a fluoro-resin powder such as powdered polytetrafluroethylene (PTFE) or powdered polyvinylidene fluoride (PVDF). More specifically, a preferred cathode active material comprises SVO in any one of its many phases, or mixtures thereof, and/or CSVO mixed with a binder material and a conductive diluent.

A preferred cathode active admixture according to the present invention comprises from about 80% to 99%, by weight, of a cathode active material comprising either one or both of the SVO and CSVO materials mixed with a suitable binder and a conductor diluent. The resulting blended cathode active mixture may be formed into a free-standing sheet prior to being contacted with a current collector to form the cathode electrode. The manner in which the cathode active mixture is prepared into a free-standing sheet is thoroughly described in U.S. Pat. No. 5,435,874 to Takeuchi et al., which is assigned to the assignee of the present invention and incorporated herein by reference. Further, cathode components for incorporation into the cell may also be prepared by rolling, spreading or pressing the cathode active mixture of the present invention onto a suitable current collector. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.). The separator may also be composed of non-woven glass, glass fiber materials and ceramic materials.

The form of the separator typically is a sheet which is placed between the anode and cathode electrodes and in a manner preventing physical contact therebetween. Such is the case when the anode is folded in a serpentine-like structure with a plurality of cathode plates disposed between the anode folds and received in a cell casing or when the electrode combination is rolled or otherwise formed into a cylindrical "jellyroll" configuration.

The electrochemical cell of the present invention further includes a nonaqueous, ionically conductive electrolyte operatively associated with the anode and the cathode electrodes. The electrolyte serves as a medium for migration of ions between the anode and the cathode during the electrochemical reactions of the cell, and nonaqueous solvents suitable for the present invention are chosen so as to exhibit those physical properties necessary for ionic transport (low viscosity, low surface tension and wettability). Suitable nonaqueous solvents are comprised of an inorganic salt dissolved in a nonaqueous solvent and more preferably an alkali metal salt dissolved in a mixture of aprotic organic solvents comprising a low viscosity solvent including organic esters, ethers and dialkyl carbonates, and mixtures thereof, and a high permittivity solvent including cyclic carbonates, cyclic esters and cyclic amides, and mixtures thereof. Low viscosity solvents include tetrahydrofuran (THF), diisopropylether, methyl acetate (MA), diglyme, triglyme, tetraglyme, 1,2-dimethoxyethane (DME), 1,2-diethoxyethane (DEE), 1-ethoxy,2-methoxyethane (EME), dimethyl carbonate (DMC), diethyl carbonate (DEC), dipropyl carbonate (DPC), ethylmethyl carbonate (EMC), methylpropyl carbonate (MPC) and ethylpropyl carbonate (EPC), and mixtures thereof. High permittivity solvents include propylene carbonate (PC), ethylene carbonate (EC), butylene carbonate (BC), acetonitrile, dimethyl sulfoxide, dimethyl formamide, dimethyl acetamide, γ-valerolactone, γ-butyrolactone (GBL) and N-methyl-pyrrolidinone (NMP), and mixtures thereof.

The preferred electrolyte comprises an inorganic alkali metal salt, and in the case of an anode comprising lithium, the alkali metal salt of the electrolyte is a lithium based salt. Known lithium salts that are useful as a vehicle for transport of alkali metal ions from the anode to the cathode include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiNO_3$, $LiB(C_6H_5)_4$ and $LiCF_3SO_3$, and mixtures thereof. Suitable salt concentrations typically range between about 0.8 to 1.5 molar, and a preferred electrolyte for a lithium/transition metal oxide electrochemical cell includes $LiAsF_6$ or $LiPF_6$ dissolved in a 50:50 mixture, by volume, of PC and DME.

In the present invention, the addition of certain additives to the electrolyte solution has beneficial effects in minimizing or eliminating voltage delay and reducing RDC build-up when the cell is subjected to current pulse discharge conditions. The additives are classified into the groups of nitrites, nitrates, carbonates, dicarbonates, phosphonate, phosphate, sulfates and hydrogen fluoride.

The nitrite additive is preferably an alkyl nitrite compound having the general formula $(RO)N(=O)$, wherein R is an organic group of either a saturated or unsaturated hydrocarbon or heteroatom substituted saturated or unsaturated organic group containing 1 to 10 carbon atoms. The greatest effect is found when methyl nitrite, ethyl nitrite, propyl nitrite, isopropyl nitrite, butyl nitrite, isobutyl nitrite, t-butyl nitrite, benzyl nitrite and phenyl nitrite, and mixtures thereof are used as additives in the electrolyte in a range of about 0.001M to about 0.20M.

The nitrate additive is preferably an alkali metal nitrate, an alkaline earth metal nitrate or an organic alkyl nitrate compound having the general formula $(RO)N(=O)_2$, wherein R is an alkali metal cation, an alkaline metal cation or an organic group of either a saturated or unsaturated hydrocarbon or heteroatom substituted saturated or unsaturated organic group containing 1 to 10 carbon atoms. The greatest effect is found when lithium nitrate, sodium nitrate, potassium nitrate, magnesium nitrate, calcium nitrate, propyl nitrate, isopropyl nitrate, butyl nitrate, isobutyl nitrate, t-butyl nitrate, benzyl nitrate and phenyl nitrate, and mixtures thereof are used as additives in the electrolyte in a range of about 0.001M to about 0.20M.

The dicarbonate additive is preferably an alkyl dicarbonate compound having the general formula $(R^1O)C(=O)OC(=O)(OR^2)$, wherein $R^1$ and $R^2$ are the same or different, and they can be a hydrogen atom or a saturated or unsaturated hydrocarbon or heteroatom organic group containing 1 to 13 carbon atoms, and at least $R^1$ has the structure $(R^3)(R^4)(R^5)C$— if $R^2 \ne H$ and wherein $R^3$, $R^4$ and $R^5$ are the same or different, and they can be a hydrogen atom or a saturated or unsaturated hydrocarbon or heteroatom group and at least $R^3$ is an unsaturated organic or an inorganic group if $R^4$ is a hydrogen atom. The greatest effect is found when dibenzyl dicarbonate, diallyl dicarbonate, di-t-butyl dicarbonate, methyl benzyl dicarbonate, ethyl benzyl dicarbonate, propyl benzyl dicarbonate, butyl benzyl dicarbonate, methyl allyl dicarbonate, ethyl allyl dicarbonate, propyl allyl dicarbonate, mono-methyl dicarbonate, mono-ethyl dicarbonate, mono-butyl dicarbonate, mono-propyl dicarbonate, mono-allyl dicarbonate, mono-benzyl dicarbonate, cyanomethyl methyl dicarbonate and nitromethyl methyl dicarbonate, and mixtures thereof are used as additives in the electrolyte in a range of about 0.001M to about 0.40M.

The phosphonate additive is preferably an alkyl phosphonate compound having the general formula $(R^1O)P(=O)(OR^2)(R^3)$ wherein $R^1$, $R^2$ and $R^3$ are the same or different, and they can be a hydrogen atom or a saturated or unsaturated organic group containing 1 to 13 carbon atoms. The greatest effect is found when dimethyl phosphonate, diethyl phosphonate, dipropyl phosphonate, dibutyl phosphonate, diphenyl phosphonate, dibenzyl phosphonate, dimethyl methylphosphonate, diethyl methylphosphonate, dipropyl methylphosphonate, dibutyl methylphosphonate, diphenyl methylphosphonate, dibenzyl methylphosphonate, dimethyl benzylphosphonate, ethyl methylphosphonate, dimethyl diphenylmethylphosphonate and phosphorous acid or phosphonic acid, and mixtures thereof are used as additives in the electrolyte in a range of about 0.001M to 0.20M.

The phosphate additive is preferably an alkyl phosphate compound having the general formula $(R^1O)P(=O)(OR^2)(OR^3)$ wherein $R^1$, $R^2$ and $R^3$ are the same or different, and they can be a hydrogen atom or a saturated or unsaturated organic group containing 1 to 13 carbon atoms. If $R^1$, $R^2$ and $R^3$ are not hydrogen, at least one of them is $CR^4R^5R^6$ where at least $R^4$ is an aromatic substituent or an unsaturated organic or inorganic group. The greatest effect is found when tris(trimethylsilyl)phosphate, tribenzyl phosphate, dimethyl benzyl phosphate, diethyl benzyl phosphate, dipropyl benzyl phosphate, dibutyl benzyl phosphate, diethyl 2-propenyl phosphate, diphenylmethyl diethyl phosphate, dimethyl phosphate, diethyl phosphate, dipropyl phosphate, dibutyl phosphate, diphenyl phosphate, dibenzyl phosphate, diallyl phosphate, mono-methyl phosphate, mono-ethyl phosphate, mono-propyl phosphate, mono-butyl phosphate, mono-phenyl phosphate, mono-benzyl phosphate and phosphoric acid, and mixtures thereof are used as additives in the electrolyte in a range of about 0.001M to about 0.40M.

The sulfate additive is preferably a dialkyl sulfate compound having the general formula $R^1OS(=O)_2(OR^2)$, wherein $R^1$ and $R^2$ are the same or different, and they can be a hydrogen atom or a saturated or unsaturated organic group containing 1 to 12 carbon atoms. The greatest effect is found when dimethyl sulfate, diethyl sulfate, dipropyl sulfate, dibutyl sulfate, didecyl sulfate, didodecyl sulfate, diphenyl sulfate, bis(4-nitrophenyl)sulfate, dibenzyl sulfate, phenyl methyl sulfate, cyclohxyl ethyl sulfate, 2-chloroethyl ethyl sulfate, ethyl 2,2,2-trifluoroethyl sulfate, bis(triethyltin) sulfate and bis(trimethylsilyl)sulfate, and mixtures thereof are used as additives in the electrolyte in a range of about 0.001M to about 0.40M.

The carbonate additive contains covalent O—X and O—Y bonds on opposite sides of a carbonyl group and have the general structure of X—O—CO—O—Y, wherein X and Y are the same or different and X is selected from $NR_1R_2$ and $CR_3R_4R_5$, Y is selected from $NR'_1R'_2$ and $CR'_3R'_4R'_5$, and wherein $R_1$, $R_2$, $R_3$, $R_4$, $R_5$, $R'_1$, $R'_2$, $R'_3$, $R'_4$ and $R'_5$ are the same or different, wherein $R_1$, $R'_1$, $R_2$ and $R'_2$ can be a hydrogen atom or saturated or unsaturated organic groups containing from 1 to 9 carbon atoms, and $R_3$, $R'_3$, $R_4$, $R'_4$, $R_5$ and $R'_5$ can be a hydrogen atom or saturated or unsaturated organic groups containing from 1 to 13 carbon atoms, and at least $R_3$ is an unsaturated substituent if X is $CR_3R_4R_5$ and Y is $CR'_3R'_4R'_5$. At least one of the O—X and the O—Y bonds has a dissociation energy less than about 80 kcal/mole.

Examples of organic carbonate additives useful with the present invention include: $X=Y=NR_1R_2$

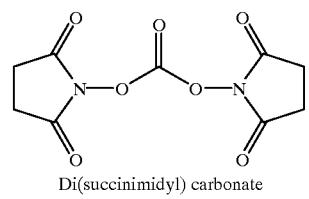

Di(succinimidyl) carbonate

-continued

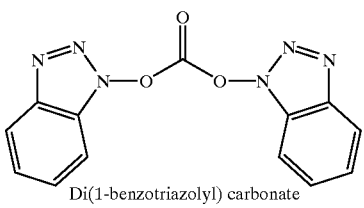

Di(1-benzotriazolyl) carbonate

X ≠ Y then X = NR₁R₂ and Y = CR₃R₄R₅

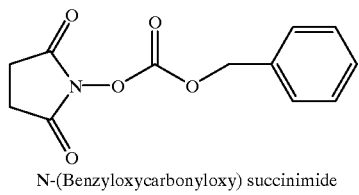

N-(Benzyloxycarbonyloxy) succinimide

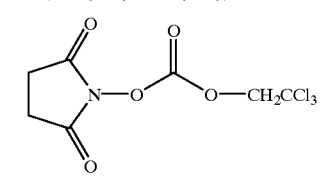

Succinimidyl-2,2,2-trichloroethyl carbonate

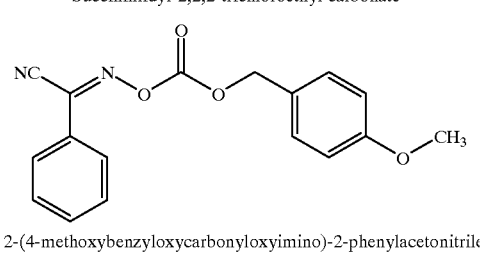

2-(4-methoxybenzyloxycarbonyloxyimino)-2-phenylacetonitrile

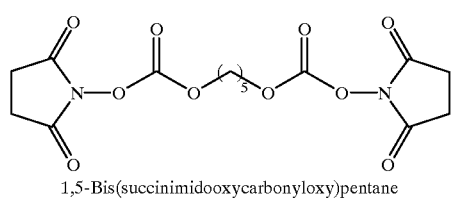

1,5-Bis(succinimidooxycarbonyloxy)pentane

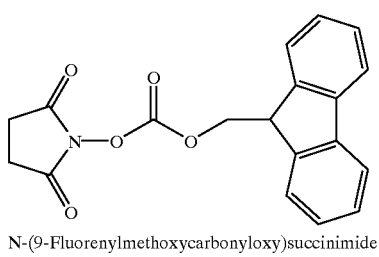

N-(9-Fluorenylmethoxycarbonyloxy)succinimide

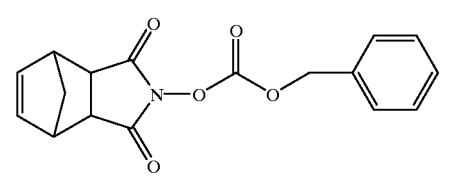

N-Benzyloxycarbonyloxy-5-norbornene-2,3-dicarboximide

X = Y = CR₃R₄R₅ and R₃ = unsaturated group

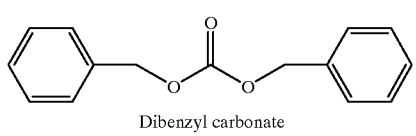

Dibenzyl carbonate

-continued

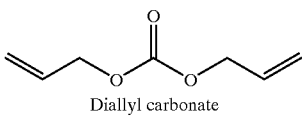

Diallyl carbonate

X ≠ Y then X = CR₃R₄R₅, R₃ = unsaturated group and Y = CR'₃R'₄R'₅

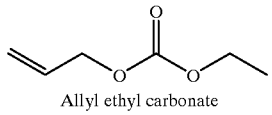

Allyl ethyl carbonate

For carbonate additives, the greatest effect is found when di-(N-succinimidyl)carbonate (DSC), benzyl-N-succinimidyl carbonate (BSC) and dibenzyl carbonate (DBC), and mixtures thereof are used as additives in the electrolyte in a range of about 0.001M to about 0.20M. For a more thorough understanding of carbonate additives that are useful with the present invention, reference is made to the previously discussed U.S. Pat. No. 5,753,389 to Gan et al., which is assigned to the assignee of the present invention and incorporated herein by reference.

The above listed nitrite, nitrate, carbonate, dicarbonate, phosphonate, phosphate and sulfate compounds are only intended to be exemplary of those that are useful with the present invention, and are not to be construed as limiting. Those skilled in the art will readily recognize compounds which come under the purview of the general formulas set forth above and which will be useful as additives for the electrolyte to reduce voltage delay and RDC build-up according to the present invention.

In the present invention, the preferred electrochemical cell has an anode of lithium metal and a cathode of the transition mixed metal oxide $AgV_2O_{5.5}$ (SVO). The silver vanadium oxide cathode material is preferably prepared in a thermal decomposition or addition reaction at a temperature of about 450° C. to about 500° C. The activating electrolyte is 1.0M to 1.4M $LiAsF_6$ dissolved in an aprotic solvent mixture comprising at least one of the above listed low viscosity solvents and at least one of the above listed high permittivity solvents having hydrogen fluoride or at least one of the listed nitrite, nitrate, carbonate, dicarbonate, phosphonate, phosphate and sulfate additives provided therein. The preferred aprotic solvent mixture comprises a 50/50 mixture, by volume, of propylene carbonate and dimethoxyethane. The preferred nitrate additives are lithium nitrate at a concentration up to about 0.01M and isopropyl nitrate at a concentration up to about 0.01M. The preferred alkyl nitrite additive in t-butyl nitrite at a concentration up to about 0.01M. The preferred alkyl dicarbonate additive is dibenzyl dicarbonate at a concentration up to about 0.20M. The preferred alkyl phosphonate additive is dibenzyl phosphonate at a concentration up to about 0.01M. The preferred alkyl phosphate additive is dibenzyl phosphate at a concentration up to about 0.20M. The preferred dialkyl sulfate additives are bis(trimethylsilyl)sulfate at a concentration up to about 0.01M and dimethyl sulfate at a concentration up to about 0.05M. The preferred organic carbonate additive is selected from DSC, BSC and DBC in a concentration range of between about 0.001M to about 0.1M.

The assembly of the cell described herein is preferably in the form of a wound element cell. That is, the fabricated cathode, anode and separator are wound together in a "jellyroll" type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with components of the cell.

The cell header comprises a metallic disc-shaped body with a first hole to accommodate a glass-to-metal seal/ terminal pin feedthrough and a second hole for electrolyte filling. The glass used is of a corrosion resistant type having up to about 50% by weight silicon such as CABAL 12, TA 23 or FUSITE 425 or FUSITE 435. The positive terminal pin feedthrough preferably comprises titanium although molybdenum, aluminum, nickel alloy, or stainless steel can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte solution comprising at least one of the additives described hereinabove and hermetically sealed such as by close-welding a stainless steel ball over the fill hole, but not limited thereto.

The above assembly describes a case-negative cell, which is the preferred construction of the exemplary cell of the present invention. As is well known to those skilled in the art, the exemplary electrochemical system of the present invention can also be constructed in a case-positive configuration.

The following example describes the manner and process of an electrochemical cell according to the present invention, and it sets forth the best mode contemplated by the inventors of carrying out the invention, but it is not construed as limiting.

EXAMPLE

The performance of Li/SVO cells was tested using silver vanadium oxide cathode active materials prepared at 375° C., 450° C., and 500° C. In addition, 0.05M dibenzyl carbonate (DBC) was added to the electrolyte activating some of the cells containing SVO prepared at 375° C. and 450C. The hermetically sealed test cells contained cathodes consisting of a mixture of, by weight, 94% SVO, 3% polytetrafluoroethylene, 2% graphite, and 1% carbon black pressed onto an expanded titanium current collector. A total of 7.92 g of cathode mix was utilized in each cell. Lithium metal in contact with an expanded nickel current collector was placed against an intermediate polypropylene separator facing the cathode. Five groups of cells (three cells per group) were constructed in that manner and activated with the following respective electrolyte solutions:

| Group | Cathode Material | Electrolyte |
|---|---|---|
| 1 | 375° C. SVO | 1M LiAsF$_6$PC/DME |
| 2 | 450° C. SVO | 1M LiAsF$_6$PC/DME |
| 3 | 500° C. SVO | 1M LiAsF$_6$PC/DME |
| 4 | 375° C. SVO | 1M LiAsF$_6$PC/DME + 0.05M DBC |
| 5 | 450° C. SVO | 1M LiAsF$_6$PC/DME + 0.05M DBC |

A constant resistance load of 3.57 kΩ was applied to all of the cells for 21 hours during an initial predischarge period. The predischarge period is referred to as burn-in and depleted the cells of approximately 1% of their theoretical capacity. Following burn-in, the cells were subjected to pulse testing under long-term test conditions which mimic the use of the cells in an implantable medical device.

The long-term pulse testing consisted of the application of constant current pulses of 2.0 Amps for 10 seconds in duration with 15 seconds of rest between each pulse. The current pulses were applied in groups of four every 60 days during discharge of the cells with a constant resistance (17.4 kΩ) background load at 37° C. The pulse testing results are presented in Table 1.

TABLE 1

| SVO Synthesis Temp ° C. | Electrolyte Additive | Pulse Train | Capacity (Ah) | Prepulse Volt(V) | P1 min Volt(V) | P1 end Volt(V) | Voltage Delay (mV) | P4 min Volt(V) | P4 min RDC |
|---|---|---|---|---|---|---|---|---|---|
| 375 | — | 1 | 0.027 | 3.227 | 2.641 | 2.641 | 0 | 2.504 | 0.361 |
| 450 | — | 1 | 0.027 | 3.213 | 2.607 | 2.607 | 0 | 2.465 | 0.374 |
| 500 | — | 1 | 0.027 | 3.209 | 2.583 | 2.583 | 1 | 2.443 | 0.383 |
| 375 | DBC | 1 | 0.027 | 3.226 | 2.625 | 2.625 | 0 | 2.484 | 0.371 |
| 450 | DBC | 1 | 0.027 | 3.215 | 2.577 | 2.578 | 1 | 2.432 | 0.391 |
| 375 | — | 2 | 0.317 | 3.177 | 2.538 | 2.538 | 0 | 2.383 | 0.397 |
| 450 | — | 2 | 0.316 | 3.146 | 2.529 | 2.529 | 0 | 2.396 | 0.375 |
| 500 | — | 2 | 0.315 | 3.138 | 2.516 | 2.516 | 0 | 2.393 | 0.372 |
| 375 | DBC | 2 | 0.317 | 3.179 | 2.540 | 2.540 | 0 | 2.374 | 0.403 |
| 450 | DBC | 2 | 0.316 | 3.150 | 2.516 | 2.516 | 0 | 2.371 | 0.389 |
| 375 | — | 3 | 0.597 | 3.040 | 2.504 | 2.504 | 0 | 2.368 | 0.336 |
| 450 | — | 3 | 0.590 | 2.943 | 2.425 | 2.425 | 0 | 2.325 | 0.309 |
| 500 | — | 3 | 0.589 | 2.935 | 2.405 | 2.406 | 1 | 2.321 | 0.307 |
| 375 | DBC | 3 | 0.598 | 3.054 | 2.495 | 2.495 | 0 | 2.351 | 0.351 |
| 450 | DBC | 3 | 0.591 | 2.956 | 2.414 | 2.414 | 0 | 2.303 | 0.327 |
| 375 | — | 4 | 0.854 | 2.731 | 2.277 | 2.277 | 1 | 2.245 | 0.243 |
| 450 | — | 4 | 0.842 | 2.726 | 2.280 | 2.280 | 0 | 2.256 | 0.235 |
| 500 | — | 4 | 0.840 | 2.715 | 2.273 | 2.273 | 0 | 2.255 | 0.230 |
| 375 | DBC | 4 | 0.855 | 2.745 | 2.291 | 2.291 | 0 | 2.220 | 0.263 |
| 450 | DBC | 4 | 0.844 | 2.735 | 2.293 | 2.293 | 0 | 2.236 | 0.250 |
| 375 | — | 5 | 1.092 | 2.566 | 1.967 | 2.054 | 87 | 2.075 | 0.246 |

TABLE 1-continued

| SVO Synthesis Temp ° C. | Electrolyte Additive | Pulse Train | Capacity (Ah) | Prepulse Volt(V) | P1 min Volt(V) | P1 end Volt(V) | Voltage Delay (mV) | P4 min Volt(V) | P4 min RDC |
|---|---|---|---|---|---|---|---|---|---|
| 450 | — | 5 | 1.081 | 2.595 | 2.133 | 2.170 | 37 | 2.196 | 0.200 |
| 500 | — | 5 | 1.079 | 2.594 | 2.136 | 2.162 | 25 | 2.189 | 0.202 |
| 375 | DBC | 5 | 1.094 | 2.566 | 2.115 | 2.141 | 26 | 2.141 | 0.213 |
| 450 | DBC | 5 | 1.084 | 2.598 | 2.170 | 2.186 | 16 | 2.201 | 0.198 |
| 375 | — | 6 | 1.328 | 2.537 | 1.686 | 1.766 | 80 | 1.830 | 0.354 |
| 450 | — | 6 | 1.320 | 2.564 | 1.897 | 2.012 | 115 | 2.024 | 0.270 |
| 500 | — | 6 | 1.317 | 2.560 | 1.873 | 2.007 | 134 | 2.023 | 0.269 |
| 375 | DBC | 6 | 1.330 | 2.532 | 1.984 | 2.005 | 21 | 1.973 | 0.280 |
| 450 | DBC | 6 | 1.323 | 2.565 | 2.058 | 2.087 | 29 | 2.101 | 0.232 |
| 375 | — | 7 | 1.556 | 2.505 | 1.820 | 1.820 | 0 | 1.763 | 0.371 |
| 450 | — | 7 | 1.550 | 2.544 | 1.834 | 1.905 | 71 | 1.902 | 0.321 |
| 500 | — | 7 | 1.547 | 2.539 | 1.831 | 1.905 | 73 | 1.900 | 0.319 |
| 375 | DBC | 7 | 1.556 | 2.464 | 1.852 | 1.852 | 0 | 1.721 | 0.372 |
| 450 | DBC | 7 | 1.553 | 2.544 | 2.033 | 2.033 | 0 | 1.988 | 0.278 |

As indicated in Table 1, voltage delay upon application of the first current pulse in pulse trains 6 and 7 is significantly reduced or eliminated for the cells in Groups 4 and 5 containing the DBC additive. As previously discussed, voltage delay is a phenomenon typically exhibited by alkali metal/transition metal oxide cells, and particularly Li/SVO cells, that have been depleted of about 40% to about 70% of their capacity. Thus, the reduction of voltage delay in pulse trains 6 and 7 is an unexpected improvement in the discharge characteristics of the present invention cells. The discharge improvements are believed attributable to the synergistic effect of the SVO cathode material prepared in a temperature range of about 450° C. to about 500° C. and activated with the nonaqueous electrolyte containing at least one organic carbonate additive therein.

FIG. 1 displays a comparison of the average voltage versus capacity curves for the pulse discharge of cells from Group 1 (375° C. SVO/no DBC additive) and Group 5 (450° C. SVO/0.05M DBC additive). In particular, curve 10 was constructed from the average prepulse potential of the prior art Li/SVO Group 1 cells, curve 12 was constructed from the average P1 minimum potential and curve 14 from the average P4 minimum potential of that cell group. In contrast, curve 16 was constructed from the average prepulse potential of the present invention Group 5 cells, curve 18 was constructed from the average P1 minimum potential and curve 20 from the average P4 minimum potential of that cell group. As can be seen from this graph and Table 1, the cells from Group 5 had much higher pulse voltages than the cells from Group 1 during pulse trains 5 to 7.

Figure 2:
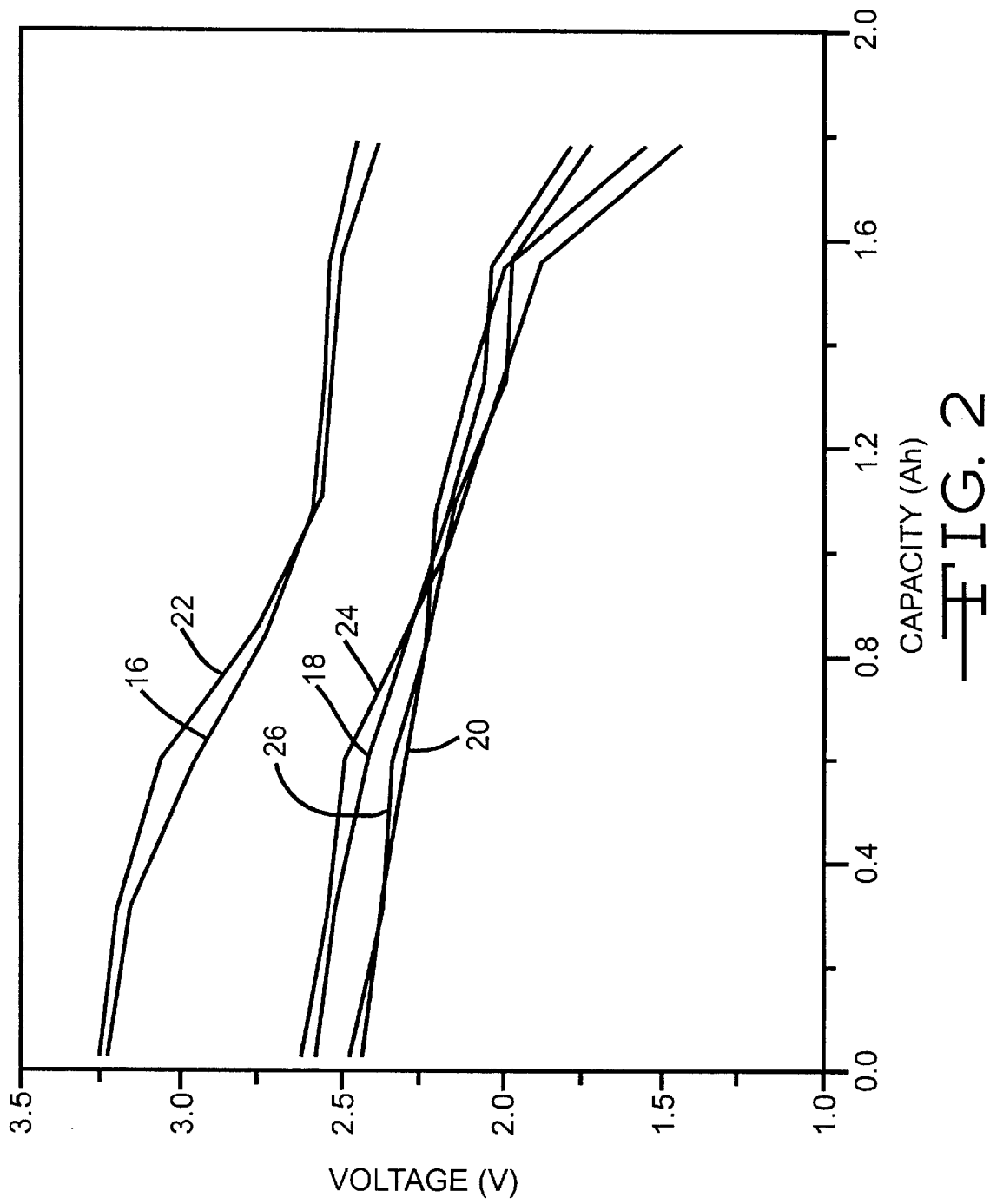
FIG. 2 is a graph constructed from the pulse discharge results of a Li/SVO cell group having a cathode active material prepared at 375° C. and with DBC added to the electrolyte in comparison to a Li/SVO cell group having a cathode active material prepared at 450° C. and with DBC in the electrolyte.

FIG. 2 displays a comparison of the cells in Group 4 (375° C. SVO/0.05M DBC additive) and Group 5 (450° C. SVO/0.05M DBC additive). In particular, curve 22 was constructed from the average prepulse potential of the Group 4 cells, curve 24 was constructed from the average P1 minimum potential and curve 26 from the average P4 minimum potential of that cell group. In contrast, curve 16, 18 and 20 were constructed from the respective average prepulse, average P1 minimum potential and average P4 minimum potential of the present invention Group 5 cells, as also shown in FIG. 1. Here it is clear that the use of the DBC additive in conjunction with 450° C. SVO provides an additional benefit of lower RDC, giving higher pulse voltages in pulse trains 5 to 7.

Figure 3:
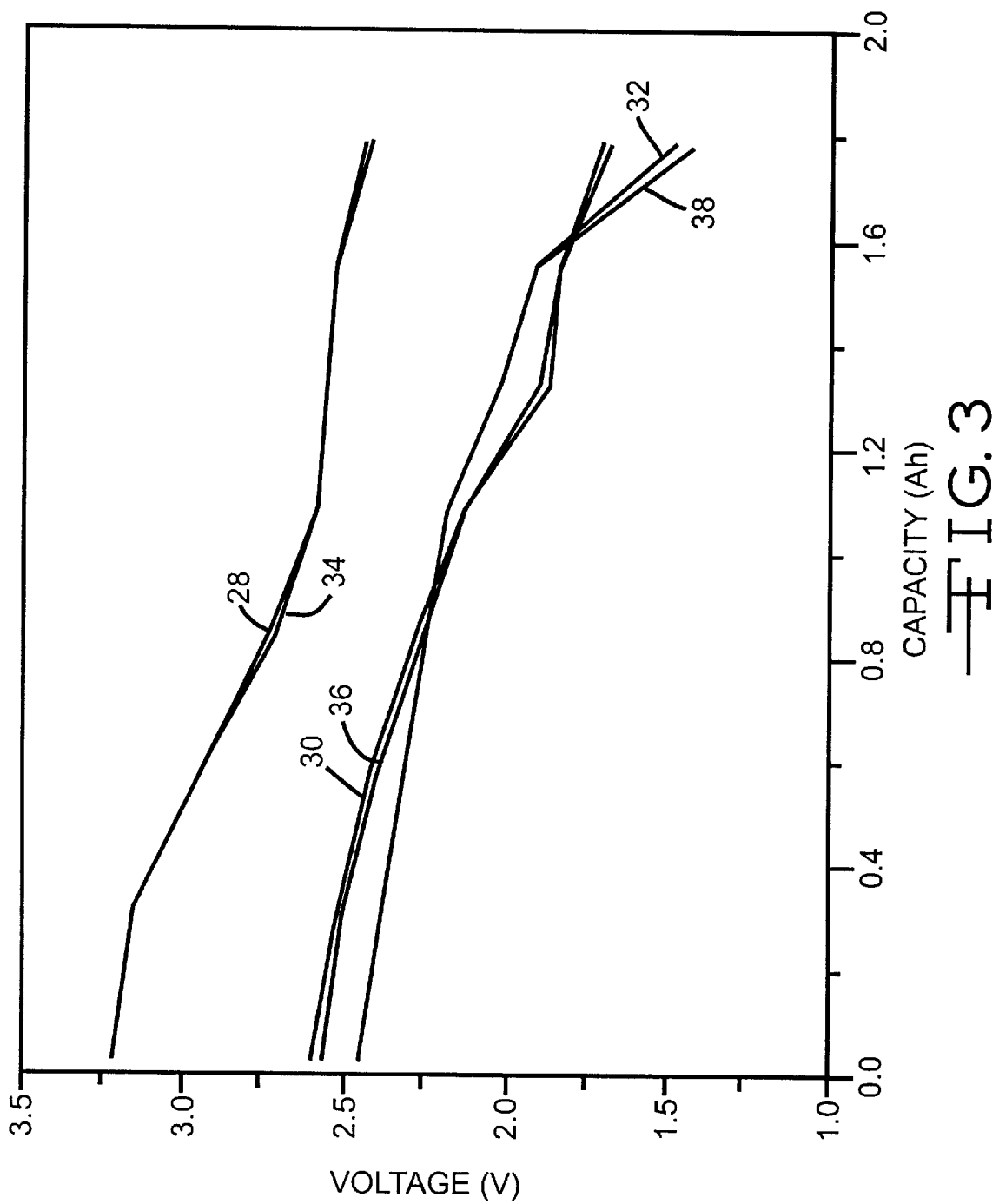
FIG. 3 is a graph constructed from the pulse discharge results of a Li/SVO cell group having a cathode active material prepared at 450° C. in comparison to a similar cell group having a cathode active material prepared at 500° C.

FIG. 3 displays a comparison of the cells in Group 2 (450° C. SVO/no DBC additive) and Group 3 (500° C. SVO/no DBC additive). In particular, curve 28 was constructed from the average prepulse potential of the Group 2 cells, curve 30 was constructed from the average P1 minimum potential and curve 32 from the average P4 minimum potential of that cell group. In contrast, curve 34 was constructed from the average prepulse potential of the Group 3 cells, curve 36 was constructed from the average P1 minimum potential and curve 38 from the average P4 minimum potential of that cell group. The close overlap of the pulse voltages of these cells indicates that improved pulse discharge characteristics are realized for a lithium cell having a cathode of SVO prepared in a range of about 450° C. to about 500° C.

From the various graphs and Table 1, it is evident that a lithium cell containing SVO material prepared at a temperature of about 400° C. or greater, and preferably in a range of 450° C. to 500° C. provides improved discharge performance in comparison to lithium cells having SVO formed in a reaction outside that temperature range. The addition of a carbonate additive to the activating electrolyte further improves the discharge performance in comparison to a Li/SVO cell having the cathode active material prepared within that temperature range but with the electrolyte devoid of a carbonate additive. These improvements are unexpected results in light of the previously discussed publication by R. A. Leising and E. S. Takeuchi, *Chemistry of Materials*, 5,738–742 (1993), which discloses that the 375° C. prepared SVO material gave slightly higher delivered capacity than the 450° C. material and significantly higher capacity than the SVO material prepared at 540° C.

Thus, the desirable decrease in both voltage delay and RDC build-up found for lithium cells containing silver vanadium oxide cathode active material prepared at a temperature of about 400° C. or greater, and preferably in a temperature range of about 450° C. to about 500° C. and activated with an electrolyte comprising 1M LiAsF$_6$ dissolved in a 50:50 mixture, by volume, of PC and DME having an additive selected from hydrogen fluoride and one of the enumerated nitrite, nitrate, carbonate, dicarbonate, phosphonate, phosphate and sulfate compounds provided therein are new and unexpected results attributable to the present invention.

It is appreciated that various modifications to the present inventive concepts described herein may be apparent to those of ordinary skill in the art without disporting from the spirit and scope of the present invention as defined by the herein appended claims.

What is claimed is:

1. An electrochemical cell comprising an alkali metal anode; a cathode; a liquid, nonaqueous electrolyte operatively associated with the anode and the cathode, the improvement in the cell comprising:

the cathode comprising a cathode active oxide produced in a reaction of a vanadium oxide and a salt of silver at a temperature of about 450° C. to about 500° C., and a carbonate additive dissolved in the electrolyte, wherein the carbonate additive is either linear or cyclic and includes covalent O—X and O—Y bonds on opposite sides of a carbonyl group and has the general structure of X—O—CO—Y, wherein at least one of the O—X and O—Y bonds has a dissociation energy less than about 80 kcal/mole, and wherein X and Y are the same or different and X is selected from $NR_1R_2$ and $CR_3R_4R_5$, and Y is selected from $NR'_1R'_2$ and $CR'_3R'_4R'_5$, and wherein $R_1$, $R_2$, $R_3$, $R_4$, $R_5$, $R'_1$, $R'_2$, $R'_3$, $R'_4$ and $R'_5$ are the same or different, wherein $R_1$, $R'_1$, $R_2$ and $R'_2$ can be a hydrogen atom or saturated or unsaturated organic groups containing from 1 to 9 carbon atoms, and $R_3$, $R'_3$, $R_4$, $R'_4$, $R_5$ and $R'_5$ can be a hydrogen atom or saturated or unsaturated organic groups containing from 1 to 13 carbon atoms, and wherein at least $R_3$ is an unsaturated substituent if X is $CR_3R_4R_5$ and Y is $CR'_3R'_4R'_5$, wherein when the cell has been discharged through about 40% of its capacity, the cell is further dischargeable to deliver either a reduced voltage delay or an improved pulse discharge voltage in comparison to a second cell having a cathode active oxide produced in a reaction of the vanadium oxide and the thermally decomposable salt of silver at a temperature outside about 450° C. to about 500° C.

2. The electrochemical cell of claim 1 wherein the cathode active oxide is selected from the group consisting of silver vanadium oxide, copper silver vanadium oxide, and mixtures thereof.

3. The electrochemical cell of claim 1 wherein the cathode active oxide is characterized as having been formed during a decomposition reaction carried out in an atmosphere selected from the group consisting of air, oxygen, argon, nitrogen and helium.

4. The electrochemical cell of claim 1 wherein the carbonate additive is selected from the group consisting of:

a) $X=Y=NR_1R_2$;

b) $X \neq Y$ then $X=NR_1R_2$ and $Y=CR_3R_4R_5$;

c) $X \neq Y$ then $X=NR_1R_2$ and $Y=NR'_1R'_2$;

d) $X=Y=CR_3R_4R_5$ and $R_3$ is an unsaturated group; and e) $X \neq Y$ then $X=CR_3R_4R_5$, $R_3$ is an unsaturated group and $Y=CR'_3R'_4R'_5$, and mixtures thereof.

5. The electrochemical cell of claim 1 wherein the carbonate additive is selected from the group consisting of di-(N-succinimidyl)carbonate, benzyl-N-succinimidyl carbonate, di(1-benzotriazolyl)carbonate, N-(benzyloxycarbonyloxy)succinimide, N-benzyloxycarbonyloxy-5-norbornene-2,3-dicarboximide, N-(9-fluorenylmethoxycarbonyloxy)succinimide, 2-(4-methoxybenzyloxycarbonyloxyimino)-2-phenylacetonitrile, 1,5-bis(succinimidooyxcarbonyloxy)pentane, succinimidyl-2,2,2-tricholoroethyl carbonate, diallyl carbonate, allyl ethyl carbonate, 4-phenyl-1,3-dioxolan-2-one, dibenzyl carbonate, and mixtures thereof.

6. The electrochemical cell of claim 1 wherein the carbonate additive is present in the electrolyte in a range of about 0.001M to about 0.20M.

7. The electrochemical cell of claim 1 wherein the anode is of an alkali metal, the electrolyte is a nonaqueous electrolyte and there is dissolved therein an alkali metal salt, wherein the alkali metal of the salt is the same as the alkali metal comprising the anode.

\* \* \* \* \*